United States Patent
Davis et al.

(10) Patent No.: US 8,647,025 B2
(45) Date of Patent: Feb. 11, 2014

(54) MONOLITHIC CERAMIC END MILL

(75) Inventors: Danny R. Davis, Asheboro, NC (US); Sean E. Landwehr, Greensburg, PA (US); Russell L. Yeckley, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 275 days.

(21) Appl. No.: 13/007,840

(22) Filed: Jan. 17, 2011

(65) Prior Publication Data

US 2012/0183363 A1    Jul. 19, 2012

(51) Int. Cl.
*B23C 5/10*    (2006.01)
(52) U.S. Cl.
CPC ........................................ *B23C 5/10* (2013.01)
USPC .................. 407/54; 407/53; 407/61; 407/119
(58) Field of Classification Search
USPC ............................. 407/53, 54, 61, 62, 63, 119
IPC ......................................................... B23C 5/04
See application file for complete search history.

(56) References Cited

U.S. PATENT DOCUMENTS

| | | | |
|---|---|---|---|
| 4,983,340 A | | 1/1991 | Montgomery |
| 5,439,811 A | * | 8/1995 | Yamashita et al. ......... 435/91.53 |
| 5,562,370 A | | 10/1996 | Vogel et al. |
| 6,439,811 B1 | | 8/2002 | Wardell |
| 7,214,006 B2 | | 5/2007 | Flynn |
| 7,322,774 B2 | | 1/2008 | Volokh |
| 7,431,538 B1 | | 10/2008 | Ni et al. |
| 2006/0060053 A1 | | 3/2006 | Tanaka et al. |
| 2006/0240971 A1 | * | 10/2006 | Yeckley ....................... 501/98.1 |
| 2007/0286691 A1 | * | 12/2007 | Glimpel et al. ................. 407/54 |
| 2008/0014421 A1 | * | 1/2008 | Inspektor et al. ............. 428/216 |
| 2008/0089749 A1 | | 4/2008 | Wells et al. |
| 2008/0199265 A1 | | 8/2008 | Hamatake et al. |
| 2008/0219782 A1 | | 9/2008 | Flynn |
| 2008/0253846 A1 | | 10/2008 | Ni et al. |
| 2008/0286056 A1 | * | 11/2008 | Tanaka et al. ................... 407/53 |
| 2009/0185878 A1 | | 7/2009 | Turrini |

(Continued)

FOREIGN PATENT DOCUMENTS

| | | | |
|---|---|---|---|
| JP | 2004141975 A | | 5/2004 |
| JP | 2007030074 A | * | 2/2007 |
| WO | 2005122690 A2 | | 12/2005 |

OTHER PUBLICATIONS

Drozda, Thomas et al., Tool and Manufacturing Engineers Handbook, Society of Manufacturing Engineers, vol. 1, Fourth Edition, pp. 10-33 to 10-34.*

(Continued)

*Primary Examiner* — Andrea Wellington
*Assistant Examiner* — Alan Snyder
(74) *Attorney, Agent, or Firm* — Matthew W. Gordon, Esq.

(57) ABSTRACT

End mills are disclosed which may be made monolithically of ceramic or other materials. The cutting portions of the end mills have lengths of cut that are no more than twice their cutting diameters and cores which are at least 0.7 times their cutting diameters. Their axial blades have cutting edges with negative radial rake and are separated by helical flutes. Their cutting ends have negative axial rake and are gashed ahead of center and have radial cutting edges with negative rake. Such end mills also have radiused corners and gashes transitioning from radial to axial at a flute. Methods of milling materials using such ceramic end mills are also disclosed.

56 Claims, 5 Drawing Sheets

(56) References Cited

U.S. PATENT DOCUMENTS

| | | | |
|---|---|---|---|
| 2010/0183383 A1 | 7/2010 | Volokh et al. | |
| 2010/0209201 A1 | 8/2010 | Davis | |
| 2010/0215447 A1 | 8/2010 | Davis | |
| 2011/0211922 A1* | 9/2011 | Maeda et al. | 407/54 |
| 2011/0268513 A1* | 11/2011 | Takagi et al. | 407/54 |

OTHER PUBLICATIONS

English machine translation of JP 2007030074 A.*

Kennametal Inc., Solid End Milling, Latrobe, PA, pp. 46-49, 2009.

E. Uhlmann et al., Tool Grinding of End Mill Cutting Tools Made from High Performance Ceramics, CIRP Annals Manufacturing Technology, prepublication article (publication date unknown).

Search Report for GB1200631.8, dated Apr. 23, 2012, 1 pg.

Hassan et al, Stress Analysis on Direct Joining of Sialon to AISI 430 Ferritic Stainless Steel, Journal of Applied Sciences, 2011, pp. 1803-1808, vol. 11 (10), Asian Network for Scientific Information.

* cited by examiner

MONOLITHIC CERAMIC END MILL

FIELD OF THE INVENTION

The present invention relates to monolithic end mills which may be made of ceramic and to methods of machining using such end mills.

BACKGROUND OF THE INVENTION

End mills are rotary tools that are used for machining many types of materials, from metals to plastics. They are supported by a shank which is generally cylindrical and adapted to be removably gripped by a motor driven chuck or functionally similar device. The shank graduates into a cutting portion on a single end end mill or into two cutting portions on a double end end mill. The cutting portion extends to an end of the end mill. The cutting portion has a plurality of cutting blades which are separated by flutes for carrying away the chips which are generated by the cutting operation. The cutting blades and the flutes may be parallel to the end mill's longitudinal axis, but more often are helical. The cutting portion typically terminates with radial cutting features designed to complement the cutting action provided by the axial portions of the cutting blades.

Until now, nearly all end mills have been made from impact resistant materials such as high speed steels and ceramic-metal composites, e.g., cemented tungsten carbide. To the extent that ceramics have been used, due to their brittleness, they usually have been restricted to being employed as cutting edge inserts that are removably fixed to a body made of a more impact resistant material, e.g., a high speed steel. Rarely is a machining tool, such as an end mill, that may be subjected to side loading made monolithically from a ceramic material.

Nonetheless, ceramic materials are attractive in cutting operations because they can withstand the high temperatures generated in the cutting zone during the cutting operation much better than metals and even cemented tungsten carbides. High cutting temperatures are beneficial because they can cause the material that is being cut to flow more easily thus increasing metal removal rates and lowering the amount of force required to cut the material. What is needed is a monolithic end mill having a design that can take advantage of the benefits of ceramics while minimizing the problems caused by their inherent brittleness.

SUMMARY OF THE INVENTION

The present invention provides end mills which may be made monolithically of ceramic. Such end mills may be made as single end or as dual end end mills. The cutting portions of the end mills according to the present invention have lengths of cut that are no more than twice their cutting diameters and cores which are at least 0.7 times their cutting diameters. Their axial blades have cutting edges with negative radial rake and are separated by helical flutes. Their cutting ends have negative axial rake and are gashed ahead of center and have radial cutting edges with negative rake. Such end mills also have radiused corners and gashes transitioning from radial to axial at a flute.

The present invention includes such end mills made monolithically from ceramic and other materials. The present invention also includes methods of milling materials using such ceramic end mills. In some preferred embodiments of the present invention the end mills are made of a SiAlON ceramic.

BRIEF DESCRIPTION OF THE DRAWINGS

The criticality of the features and merits of the present invention will be better understood by reference to the attached drawings. It is to be understood, however, that the drawings are designed for the purpose of illustration only and not as definitions of the limits of the present invention.

DETAILED DESCRIPTION OF PREFERRED EMBODIMENTS OF THE INVENTION

In this section, some preferred embodiments of the present invention are described in detail sufficient for one skilled in the art to practice the present invention. It is to be understood, however, that the fact that a limited number of preferred embodiments are described herein does not in any way limit the scope of the present invention as set forth in the appended claims.

Whenever the term "about" is used herein or in the appended claims to modify the dimensions of a feature of an embodiment of the present invention, it is to be construed as referring to the machining tolerances related to the making of the relevant feature. Whenever a range is used herein or in the appended claims to describe the dimensions of a feature of an embodiment of the present invention, the range is to be construed as including the stated end points of the range and every point therebetween.

Figure 1A:
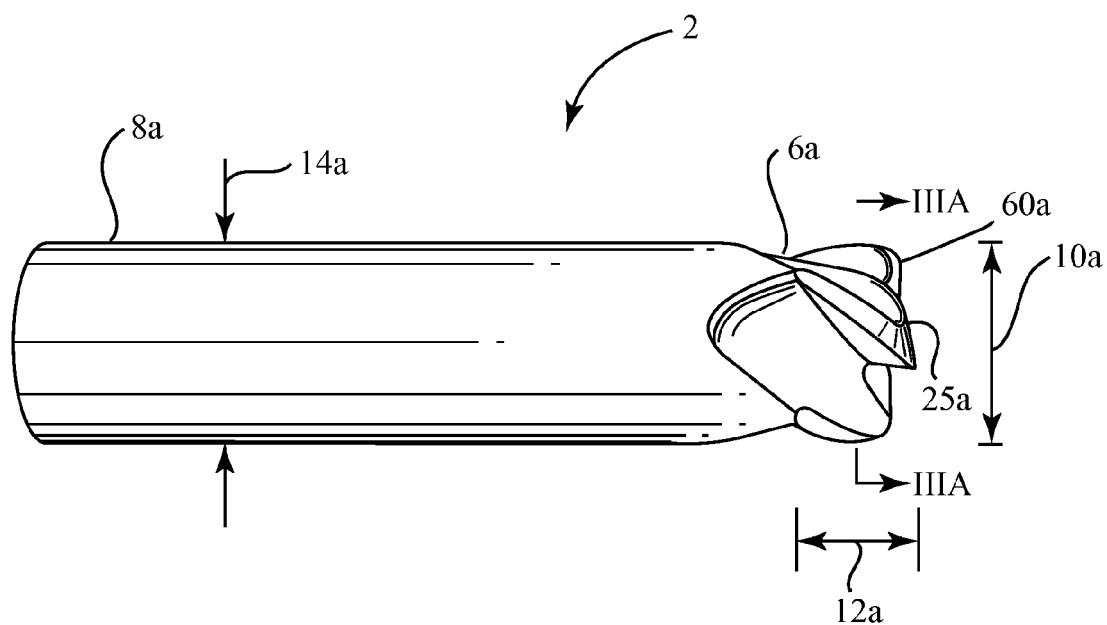
FIG. 1A is a plan view of an end mill having four flutes according to an embodiment of the present invention.
Figure 1B:
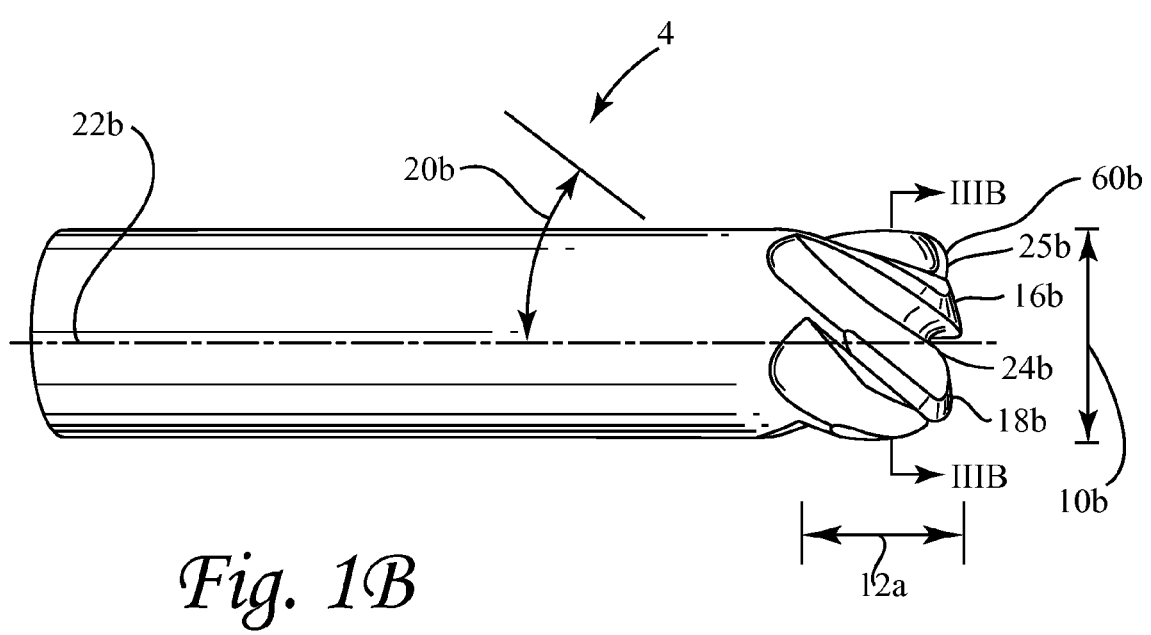
FIG. 1B is a plan view of an end mill having six flutes according to an embodiment of the present invention.

FIGS. 1A and 1B show side views of embodiments of monolithic end mills 2, 4 according to the present invention having four and six flutes, respectively. Referring to FIG. 1A, end mill 2 has a cutting portion 6a extending from a shank portion 8a. The cutting portion 6a has a cutting diameter 10a and an axial length of cut 12a that is no more that about twice the cutting diameter 10a. Note that although the shank diameter 14a in this embodiment is substantially the same as the cutting diameter 10a, it is within the contemplation of the present invention that these diameters may be substantially different. When differing shank and cutting diameters are used, it is preferred that stress concentration features, such as sharp corners, be avoided in the transition zone between the two diameters.

Referring now to FIG. 1B, end mill 4 has a plurality of blades, e.g., blades 16b, 18b disposed at a helical angle 20b from the longitudinal axis 22b of the end mill 6 and defining the cutting diameter 10b. Adjacent blades, e.g., blades 16b, 18b, are separated by a flute, e.g., flute 24b. The blades extend along the axial length of cut 12b and onto the cutting end 25b of the end mill 4.

Figure 2A:
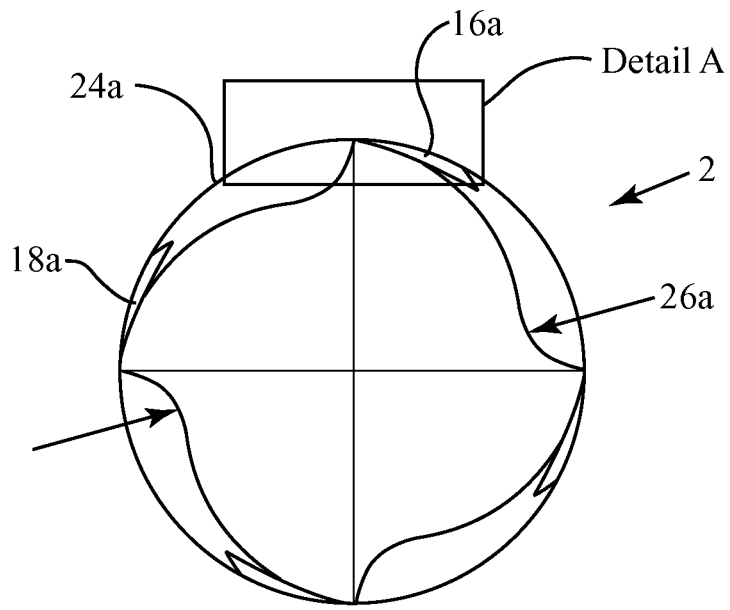
FIG. 2A is an end view taken at the plane IIIA-IIIA in FIG. 1A.
Figure 2B:
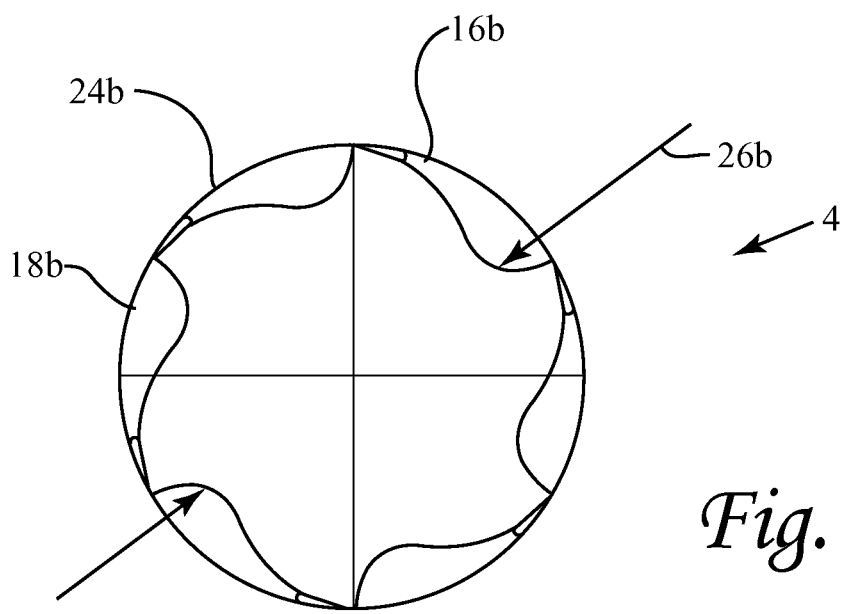
FIG. 2B is an end view taken at the plane III-IIIB in FIG. 1B.

FIGS. 2A and 2B show end views of end mills 2, 4 taken at cutting planes IIIA-IIIA and IIIB-IIIB, respectively. These drawings more clearly show the separations of adjacent blades, e.g. blades 16a, 18a, by flutes, e.g., flute 24a. The core diameters 26a, 26b, respectively of end mills 2, 4, are no more than 0.7 times their respective cutting diameters 10a, 10b. Preferably, the core diameter 26a is about 0.715 times the cutting diameter 10a of end mill 2 and the core diameter 26b is about 0.75 times the cutting diameter 10b of end mill 4.

Figure 3:
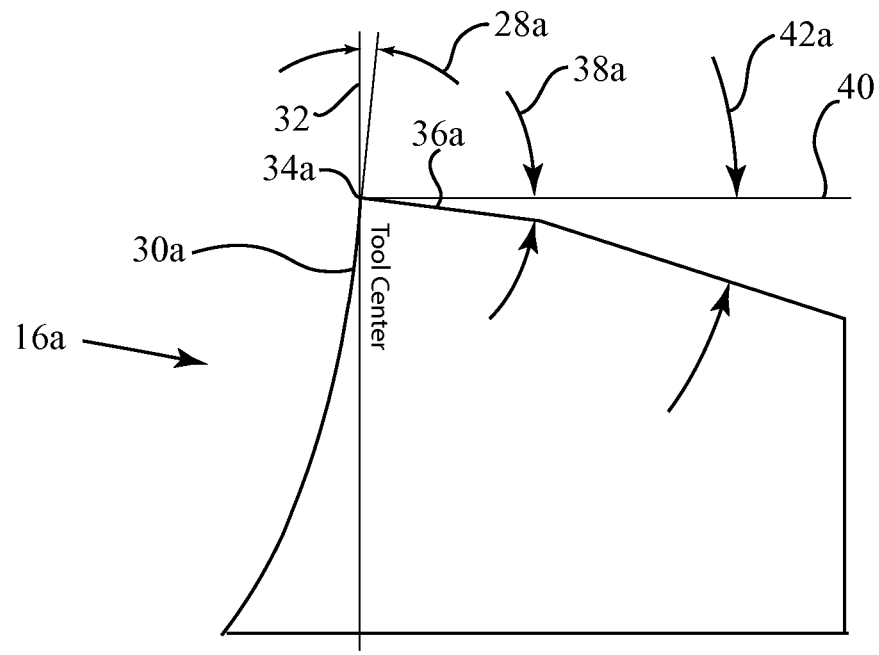
FIG. 3 is a partial end view showing Detail A of FIG. 2A in more detail.

FIG. 3 shows a portion of the representative blade 16a of end mill 2 in more detail. The blade 16a has a negative radial rake angle 28a measured on its flank or face 30a with respect to radius 32. The blade 16a has a cutting edge 34a at the intersection of its flank 30a and its radial primary land 36a. The radial primary land 36a is preferably disposed to form a radial primary relief angle 38a with respect to a tangent 40 taken at the cutting edge 34a. The blade 16a is also preferably provided with a radial secondary relief angle 42a with respect to tangent 40 trailing the axial primary land 36a.

Figure 4A:
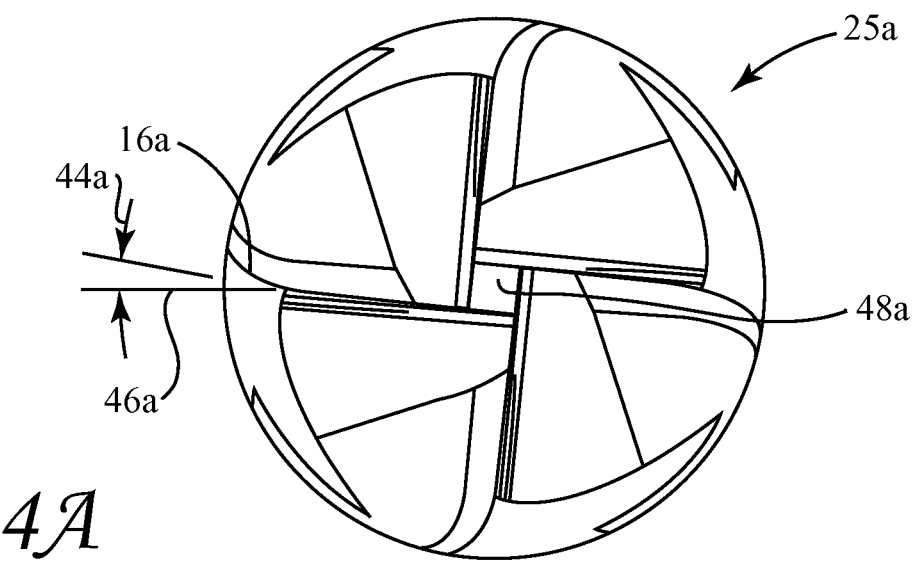
FIG. 4A is an end view of the cutting end of the end mill of FIG. 1A.
Figure 4B:
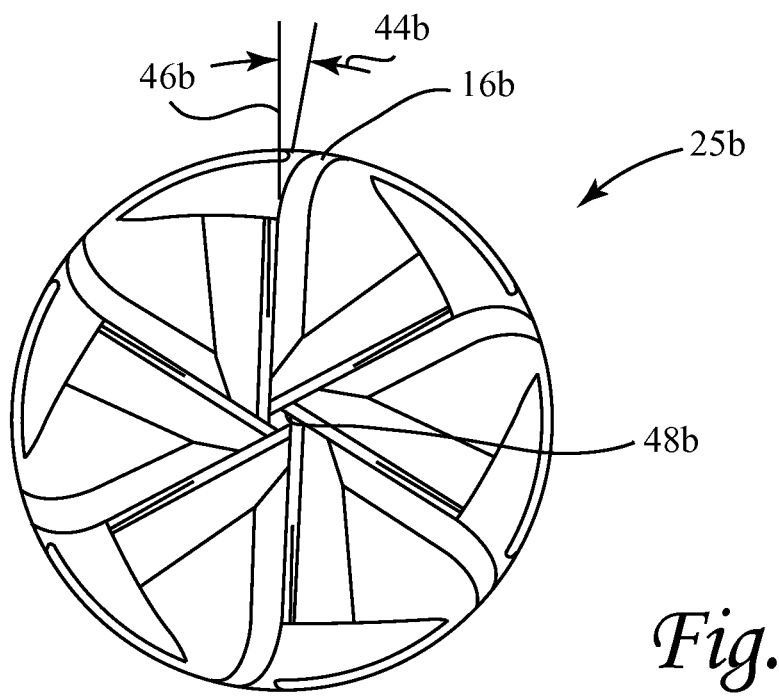
FIG. 4B is an end view of the cutting end of the end mill of FIG. 1B.

FIGS. 4A and 4B show the cutting ends 25a, 25b of end mills 2, 4, respectively. Referring to FIG. 4A, it can be seen that the blades of the end mill 2, e.g., blade 16a, extend onto the cutting end 25a at a negative radial angle or endrake 44a with respect to radius 46a and terminate proximate to a web 48a. Similarly, referring to FIG. 4B, it can be seen that the blades of the end mill 4, e.g., blade 16b, extend onto the cutting end 25b at negative radial angle or endrake 44b with respect to radius 46b and terminate proximate to a web 48b.

Figure 5:
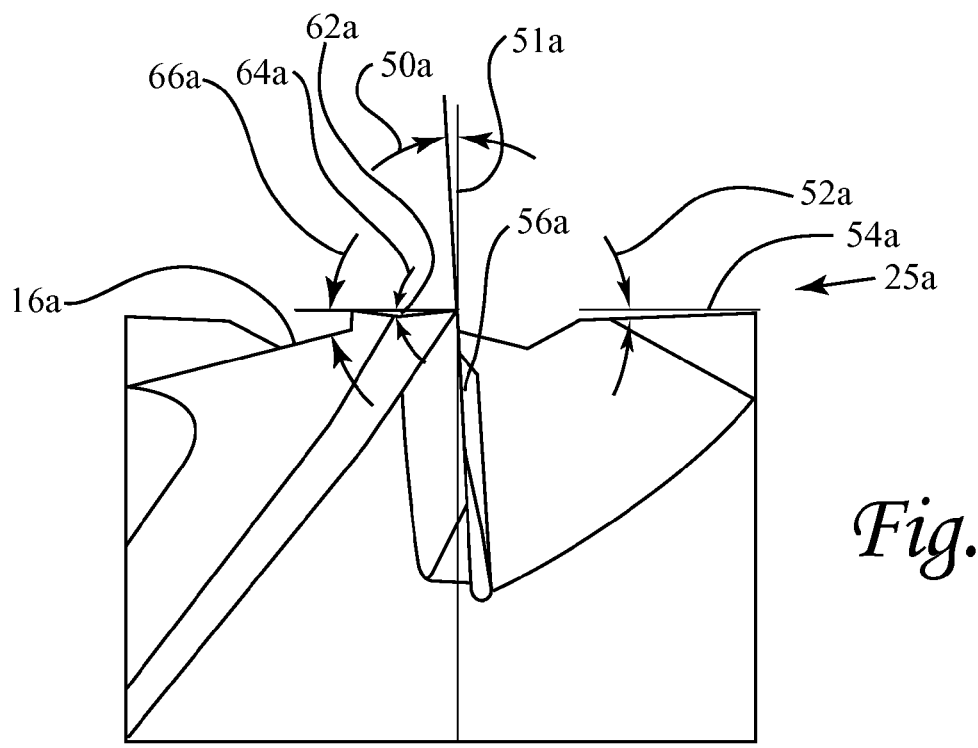
FIG. 5 is a plan view near the cutting end of the end mill of FIG. 1A illustrating a detail of one of the blades.

Referring now to FIG. 5, there is shown a plan view of a portion of blade 16a proximate the cutting end 25a of end mill 2. The blade 16a has a negative axial rake angle 50a measured with respect to a plane 54a containing the longitudinal axis 22a of the end mill 2. FIG. 5 also illustrates the fact that the cutting end 25a has a dish angle 52a with respect to the plane 54a which is perpendicular to the longitudinal axis 22a and tangent to the cutting end 25a. The gash 56a adjacent to the blade 16a is also illustrated in this drawing. The blade 16a also has an axial primary land 62a disposed at an axial primary relief angle 64a from the tangent plane 54a and an axial secondary relief angle 66a with respect to the tangent plane 54a trailing the axial primary land 62a.

Figure 7:
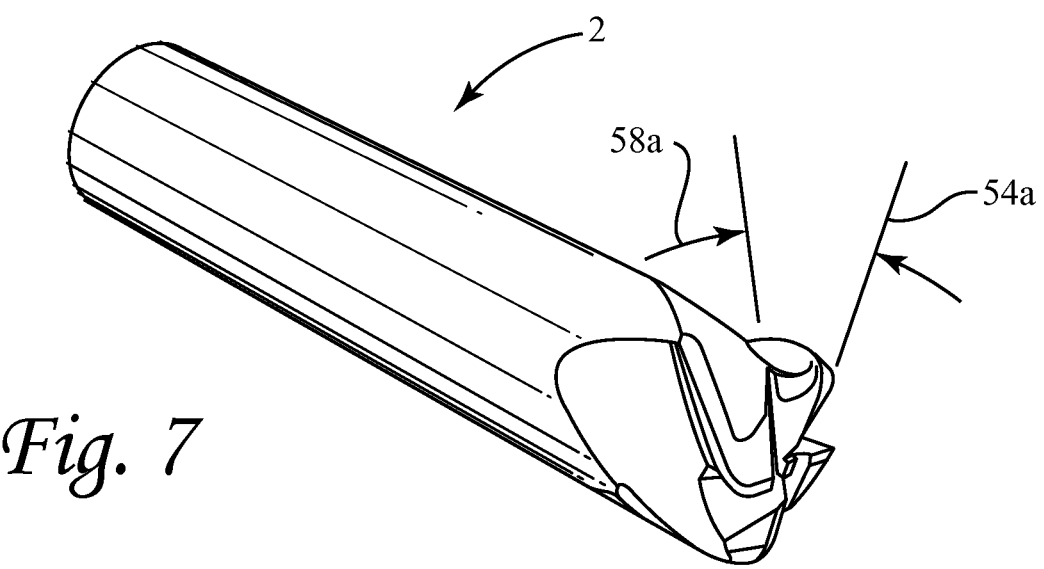
FIG. 7 is a perspective view of a portion of the cutting end of the end mill of FIG. 1A.
Figure 6:
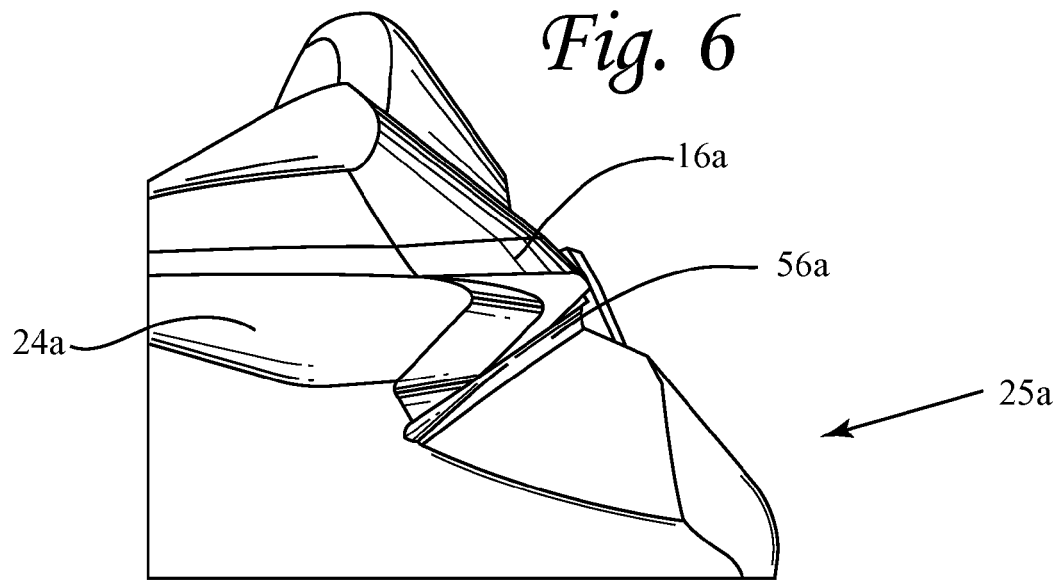
FIG. 6 is a perspective view of a portion of the cutting end of the end mill of FIG. 1A.

FIG. 6 presents another view of a portion of the blade 16a shown in FIG. 5. It can be seen here how the gash 56a preferably spirally blends from radial to axial as it transitions into flute 24a. As can be seen in FIG. 7, the gash 56a is disposed at a gash angle 58a from the cutting end tangent plane 54a.

Referring again to FIGS. 1A and 1B, it can be seen that the blades of the end mills 2, 4 have radiused corners, e.g. corners 60a, 60b, at their transitions onto the cutting ends 25a, 25b.

In preferred embodiments, the features identified above of the end mills of the present invention are within the following dimensional ranges: (a) the length of cut is less than twice the cutting diameter, and more preferably in the range of from about one to two times the cutting diameter; (b) the core diameter is at least 0.7 times the cutting diameter; (c) the helical angle at which the blades are disposed to the longitudinal axis is in the range of from about 39 to about 41 degrees; (d) the number of blades or of flutes is in the range of from three to eight; (e) the endrake is in the range of from about −1 to about −6 degrees; (f) the corner radius is in the range of about 0.031 to about 0.4 times the cutting diameter, and more preferably in the range of about 0.063 to about 0.25 times the cutting diameter; (g) the radial rake is in the range of about 0 to about −4 tangential degrees; (h) the axial rake is in the range of about −1 to about −3 degrees; (i) the dish angle is in the range of from about 1.5 to about 3 degrees; and (j) the gash angle is in the range of from about 15 to about 30 degrees. It is also preferred that the cutting diameter remain constant along the length of cut, but it is also within the contemplation of the present invention for there to be positive or negative taper along the length of cut. Although the cutting diameter may have any value, preferred embodiments of the present invention have cutting diameters in the range of from about 2 to about 20 millimeters, and even more preferred embodiments have cutting diameters in the range of from about 4 to about 16 millimeters. It is also preferred that the core diameter increase as the number of blades increases.

Although the end mills of the present invention may be made of any conventional end mill material, e.g., high speed steels or cemented tungsten carbides, it is preferred to make them from a ceramic material. Examples of such ceramic materials include alumina reinforced with silicon carbide whiskers, alumina titanium carbonitrides, stabilized zirconia, silicon carbide, and silicon nitride-based ceramics. More preferably, the ceramic is a silicon aluminum oxynitride (SiAlON) ceramic. Preferred SiAlON ceramics comprise, in weight percent, 2 to 20% aluminum, 1 to 12% oxygen, 2 to 12% total of one or more rare earth elements, a balance of silicon and nitrogen, and have up to 50% alpha phase. Examples of such preferred SiAlON ceramics comprise, in weight percent, 3 to 7% aluminum, 1 to 4% oxygen, 3 to 8% ytterbium, up to 1% lanthanum, and a balance of silicon and nitrogen, and have 20 to 45% alpha phase. Among the more preferred SiAlON ceramics are the following grades which are commercially available from Kennametal Inc., of Latrobe, Pa., US: KY1540™ SiAlON which comprises, in weight percent, 6.5% aluminum, 3.7% oxygen, 7.2% ytterbium, and a balance of silicon and nitrogen, and has between 25 and 40% alpha phase; KYS30™ SiAlON which comprises, in weight percent, 6.8% aluminum, 3.5% oxygen, 5.5% ytterbium, 0.7% lanthanum, and a balance of silicon and nitrogen, and has between 23 and 35% alpha phase; and SP1300™ SiAlON which comprises, in weight percent, 3.9% aluminum, 1.7% oxygen, 4.0% ytterbium, 0.5% lanthanum, and a balance of silicon and nitrogen, and has between 25 and 45% alpha phase. For cutting speeds which are less than 600 meters/minute, it is preferred that the SiAlON ceramic comprises, in weight percent, no more than 5% aluminum, no more than 2% oxygen, no more than 5% ytterbium, more than 0.3% lanthanum, and a balance of silicon and nitrogen, and have 20 to 45% alpha phase. For cutting speeds which are equal to or greater than 600 meters/minute, it is preferred that the SiAlON ceramic comprise, in weight percent, at least 5% aluminum, at least 2% oxygen, at least 5% ytterbium, at least 0.8% lanthanum, and a balance of silicon and nitrogen, and has 25 to 45% alpha phase.

When the end mills of the present invention are constructed from conventional end mill materials, conventional processes for producing an end mill starting blank may be used followed by conventional machining and finishing techniques to produce the end mill. When the end mills of the present invention are constructed from a ceramic, it is preferred that the starting blank be produced by pressing and sintering the appropriate precursor particulate materials followed by centerless grinding to form a starting blank. The pressing and sintering may include such substeps as hot or cold uniaxial pressing and hot or cold isostatic pressing. The ceramic blanks may then be processed using conventional machining and finishing techniques taking into consideration the properties of the ceramic material involved. Preferably, the end mills are lightly honed using a high pressure abrasive particle-bearing liquid medium to remove particles from the cutting edges while avoiding the formation of microfractures.

EXAMPLES

Examples 1-4

End mills Examples 1-4 according to embodiments of the present invention were machined from SiAlON to have the features described in Table 1.

TABLE 1

| Feature | Example 1 | Example 2 | Example 3 | Example 4 |
|---|---|---|---|---|
| Overall length (mm) | 62.00 | 62.00 | 62.00 | 62.00 |
| Shank diameter (mm) | 8.00 | 12.00 | 8.00 | 12.00 |
| Cutting diameter (mm) | 8.00 | 12.00 | 8.00 | 12.00 |
| Core diameter (mm) | 5.74 | 8.59 | 5.99 | 9.02 |
| Cutting length (mm) | 4.01 | 5.99 | 4.01 | 5.99 |
| Number of flutes | 4 | 4 | 6 | 6 |
| Corner radius (mm) | 1.00 | 1.50 | 1.00 | 1.50 |
| Helical angle (degrees) | 40 | 40 | 40 | 40 |
| Radial rake (tangential degrees) | −2 | −2 | −2 | −2 |
| Radial primary land (mm) | 0.33 | 0.48 | 0.33 | 0.48 |
| Radial primary relief angle (degrees) | 8 | 8 | 8 | 8 |
| Radial secondary relief angle (degrees) | 18 | 18 | 18 | 18 |
| Axial rake (degrees) | 2 | 2 | 2 | 2 |
| Axial primary land (mm) | 0.48 | 0.71 | 0.48 | 0.71 |
| Axial primary relief angle (degrees) | 8 | 8 | 8 | 8 |
| Axial secondary relief angle (degrees) | 18 | 18 | 18 | 18 |
| Gash angle (degrees) | 27 | 27 | 18 | 18 |
| Endrake (degrees) | 5 | 5 | 2 | 2 |
| Web thickness (millimeters) | 0.69 | 1.04 | 0.28 | 0.41 |
| Dish angle (degrees) | 2.5 | 2.5 | 2 | 2 |

Example 5

An end mill according to the present invention having the dimensions of Example 3 was made from KYS30™ SiAlON and used to cut Inconel 718 without coolant at a high cutting speed of 720 meters/minute and a metal removal rate of about 14,500 mm³/minute. The end mill was examined and found to have little chipping or metal buildup and had not reached its end of life. The radial facet wear was measured to be 0.4 mm.

Examples 6-8

End mills according to the present invention having the dimensions of Examples 1 and 3 were made from KY1540™ SiAlON (Example 6), KYS30™ SiAlON (Example 7), and SP1300™ SiAlON (Example 8). Each was used to cut Inconel 718 at a low cutting speed of 300 meters/minute without a coolant at a metal removal rate of 5,150 mm³/minute. After removing 2400 cubic millimeters of metal from the workpiece, each tool was examined and found to have little chipping or metal buildup and none had reached its end of life. The facet wear was measured to be 0.16 mm for Example 8 (SP1300™ SiAlON), 0.30 mm for Example 6 (KY1540™ SiAlON), and 0.40 mm for Example 7 (KYS30™ SiAlON).

These results were surprising because one would not have expected the SiAlON end mills that work well at high cutting speeds (as evidenced by Example 5) where chipping is the dominant factor in cutting life to also work well at low cutting speeds (as evidenced by Examples 6-8) where wear is the dominant factor. Furthermore, in view of the results, it is preferred that SiAlON materials similar to SP1300 be used for cutting at low speeds, i.e. below 600 meters/minute, and those similar to KY1540 and KYS30 be used for high cutting speeds, i.e., at or greater than 600 meters/minute.

While only a few embodiments of the present invention have been shown and described, it will be obvious to those skilled in the art that many changes and modifications may be made thereunto without departing from the spirit and scope of the present invention as described in the following claims. All patent applications, patents, and all other publications referenced herein are incorporated herein in their entireties to the full extent permitted by law.

What is claimed is:

1. A monolithic end mill having a longitudinal axis, the end mill comprising:
    a shank portion extending along the longitudinal axis; and
    at least one cutting portion extending from the shank portion and including a cutting tip having a web, the cutting portion having a cutting diameter, an axial length of cut that is no more than twice the cutting diameter, a core diameter that is at least 0.7 times the cutting diameter, and a plurality of blades disposed at a helical angle from the longitudinal axis along the axial length of cut and extending at a radial angle onto the cutting tip to form a negative endrake across an axial cutting edge and terminating proximate to the web;
    wherein each of the blades of the plurality of blades is separated from one another by a flute and has a corner radius, a negative radial rake, and a negative axial rake; and
    wherein the cutting tip has a dish angle and a plurality of gashes, each of the gashes of the plurality of gashes having a gash angle and extending into one of the flutes and wherein the end mill is constructed from a ceramic.

2. The monolithic end mill of claim 1, wherein the end mill is constructed from a material selected from the group consisting of alumina reinforced with silicon carbide whiskers, alumina titanium carbonitrides, stabilized zirconia, silicon carbide, and silicon nitride-based ceramics.

3. The monolithic end mill of claim 1, wherein the end mill is constructed from a SiAlON ceramic.

4. The monolithic end mill of claim 1, wherein the end mill is constructed from a SiAlON ceramic comprising 2 to 20% aluminum, 1 to 12% oxygen, 2 to 12% total of one or more rare earth elements, a balance of silicon and nitrogen, and having up to 50% alpha phase.

5. The monolithic end mill of claim 1, wherein the end mill is constructed from a SiAlON ceramic comprising, in weight percent, 3 to 7% aluminum, 1 to 4% oxygen, 3 to 8% ytterbium, up to 1% lanthanum, and a balance of silicon and nitrogen, and having 20 to 45% alpha phase.

6. The monolithic end mill of claim 1, wherein the helical angle is in the range of from about 39 to about 41 degrees.

7. The monolithic end mill of claim 1, wherein the radial rake is in the range of from about 0 to about −4 tangential degrees.

8. The monolithic end mill of claim 1, wherein the axial rake is in the range of from about −1 to about −3 degrees.

9. The monolithic end mill of claim 1, wherein the corner radius is in the range of from about 0.031 to about 0.4 times the cutting diameter.

10. The monolithic end mill of claim 1, wherein the endrake is in the range of from about −1 to about −6 degrees.

11. The monolithic end mill of claim 1, wherein the gash angle is in the range of from about 15 to about 30 degrees.

12. The monolithic end mill of claim 1, wherein the dish angle is in the range of from about 1.5 to about 3 degrees.

13. The monolithic end mill of claim 1, wherein the number of flutes is in the range of from 3 to 8.

14. The monolithic end mill of claim 1, wherein the number of cutting portions is two.

15. The monolithic end mill of claim 1, wherein the axial length of cut is in the range of from about one to about two times the cutting diameter.

16. The monolithic end mill of claim 1, wherein the cutting diameter is in the range of from about 2 to about 20 millimeters.

17. A monolithic end mill having a longitudinal axis, the end mill comprising:
    a shank portion extending along the longitudinal axis; and
    at least one cutting portion extending from the shank portion and including a cutting tip having a web, the cutting portion having a cutting diameter, an axial length of cut that is no more than twice the cutting diameter, a core diameter that is at least 0.7 times the cutting diameter, and a plurality of blades disposed at a helical angle from the longitudinal axis of from about 39 to about 41 degrees along the axial length of cut and extending at a radial angle onto the cutting tip to form an endrake in the range of from about −1 to about −6 degrees and terminating proximate to the web;
    wherein each of the blades of the plurality of blades is separated from one another by a flute and has a corner radius in the range of from about 0.031 to about 0.4 times the cutting diameter, a negative radial rake in the range of from about 0 to about −4 tangential degrees, and a negative axial rake in the range of about −1 to about −3 degrees; and
    wherein the cutting tip has a dish angle in the range of from about 1.5 to about 3 degrees and a plurality of gashes, each of the gashes of the plurality of gashes having a gash angle in the range of from about 15 to about 30 degrees and extending into one of the flutes.

18. The monolithic end mill of claim 17, wherein the end mill is constructed from a ceramic.

19. The monolithic end mill of claim 17, wherein the end mill is constructed from a material selected from the group consisting of alumina reinforced with silicon carbide whiskers, alumina titanium carbonitrides, stabilized zirconia, silicon carbide, and silicon nitride-based ceramics.

20. The monolithic end mill of claim 17, wherein the end mill is constructed from a SiAlON ceramic.

21. The monolithic end mill of claim 17, wherein the end mill is constructed from a SiAlON ceramic comprising, in weight percent, 2 to 20% aluminum, 1 to 12% oxygen, 2 to 12% total of one or more rare earth elements, a balance of silicon and nitrogen, and having up to 50% alpha phase.

22. The monolithic end mill of claim 17, wherein the end mill is constructed from a SiAlON ceramic comprising, in weight percent, 3 to 7% aluminum, 1 to 4% oxygen, 3 to 8% ytterbium, up to 1% lanthanum, and a balance of silicon and nitrogen, and having 20 to 45% alpha phase.

23. The monolithic end mill of claim 17, wherein the number of flutes is in the range of from three to eight.

24. The monolithic end mill of claim 17, wherein the number of cutting portions is two.

25. The monolithic end mill of claim 17, wherein the axial length of cut is in the range of from about one to about two times the cutting diameter.

26. The monolithic end mill of claim 17, wherein the cutting diameter is in the range of from about 2 to about 20 mm.

27. A method of machining an object comprising contacting the object with an end mill having a longitudinal axis, the end mill spinning at a preselected cutting speed around its longitudinal axis while the end mill is in contact with the object, the end mill including
    a shank portion extending along the longitudinal axis; and
    at least one cutting portion extending from the shank portion and including a cutting tip having a web, the cutting portion having a cutting diameter, an axial length of cut that is no more than twice the cutting diameter, a core diameter that is at least 0.7 times the cutting diameter, and a plurality of blades disposed at a helical angle from the longitudinal axis along the axial length of cut and extending at a radial angle onto the cutting tip to form a negative endrake across an axial cutting edge and terminating proximate to the web;
    wherein each of the blades of the plurality of blades is separated from one another by a flute and has a corner radius, a negative radial rake, and a negative axial rake; and
    wherein the cutting tip has a dish angle and a plurality of gashes, each of the gashes of the plurality of gashes having a gash angle and extending into one of the flutes and wherein the end mill is constructed from a ceramic.

28. The method of claim 27, wherein the end mill is constructed from a material selected from the group consisting of alumina reinforced with silicon carbide whiskers, alumina titanium carbonitrides, stabilized zirconia, silicon carbide, and silicon nitride-based ceramics.

29. The method of claim 27, wherein the end mill is constructed from a SiAlON ceramic.

30. The method of claim 27, wherein the end mill is constructed from a SiAlON ceramic comprising in weight percent, 2 to 20% aluminum, 1 to 12% oxygen, 2 to 12% total of one or more rare earth elements, a balance of silicon and nitrogen, and having up to 50% alpha phase.

31. The method of claim 27, wherein the end mill is constructed from a SiAlON ceramic comprising, in weight percent, 3 to 7% aluminum, 1 to 4% oxygen, 3 to 8% ytterbium, up to 1% lanthanum, and a balance of silicon and nitrogen, and having 20 to 45% alpha phase.

32. The method of claim 27, wherein the cutting speed is less than 600 meters per minute, and the end mill is constructed of a SiAlON ceramic comprising, in weight percent, no more than 5% aluminum, no more than 2% oxygen, no more than 5% ytterbium, more than 0.3% lanthanum, and a balance of silicon and nitrogen, and have 20 to 45% alpha phase.

33. The method of claim 27, wherein the cutting speed is 600 meters per minute or greater, and the end mill is constructed of a SiAlON ceramic comprising, in weight percent, at least 5% aluminum, at least 2% oxygen, at least 5% ytterbium, at least 0.8% lanthanum, and a balance of silicon and nitrogen, and has 25 to 45% alpha phase.

34. The method of claim 27, wherein the helical angle is in the range of from about 39 to about 41 degrees.

35. The method of claim 27, wherein the radial rake is in the range of from about 0 to about −4 tangential degrees.

36. The method of claim 27, wherein the axial rake is in the range of from about −1 to about −3 degrees.

37. The method of claim 27, wherein the corner radius is in the range of from about 0.031 to about 0.4 times the cutting diameter.

38. The method of claim 27, wherein the endrake is in the range of from about −1 to about −6 degrees.

39. The method of claim 27, wherein the gash angle is in the range of from about 15 to about 30 degrees.

40. The method of claim 27, wherein the dish angle is in the range of from about 1.5 to about 3 degrees.

41. The method of claim 27, wherein the number of flutes is in the range of from 3 to 8.

42. The method of claim 27, wherein the number of cutting portions is two.

43. The method of claim 27, wherein the axial length of cut is in the range of from about one to about two times the cutting diameter.

44. The method of claim 27, wherein the cutting diameter is in the range of from about 2 to about 20 millimeters.

45. A method of machining an object comprising contacting the object with an end mill having a longitudinal axis, the end mill spinning at a preselected cutting speed around its longitudinal axis while the end mill is in contact with the object, the end mill including
- at least one cutting portion extending from the shank portion and including a cutting tip having a web, the cutting portion having a cutting diameter, an axial length of cut that is no more than twice the cutting diameter, a core diameter that is at least 0.7 times the cutting diameter, and a plurality of blades disposed at a helical angle from the longitudinal axis of from about 39 to about 41 degrees along the axial length of cut and extending at a radial angle onto the cutting tip to form an endrake in the range of from about −1 to about −6 degrees and terminating proximate to the web;
- wherein each of the blades of the plurality of blades is separated from one another by a flute and has a corner radius in the range of from about 0.031 to about 0.4 times the cutting diameter, a negative radial rake in the range of from about 0 to about −4 tangential degrees, and a negative axial rake in the range of about −1 to about −3 degrees; and
- wherein the cutting tip has a dish angle in the range of from about 1.5 to about 3 degrees and a plurality of gashes, each of the gashes of the plurality of gashes having a gash angle in the range of from about 15 to about 30 degrees and extending into one of the flutes.

46. The method of claim 45, wherein the end mill is constructed from a ceramic.

47. The method of claim 45, wherein the end mill is constructed from a material selected from the group consisting of alumina reinforced with silicon carbide whiskers, alumina titanium carbonitrides, stabilized zirconia, silicon carbide, and silicon nitride-based ceramics.

48. The method of claim 45, wherein the end mill is constructed from a SiAlON ceramic.

49. The method of claim 45, wherein the end mill is constructed from a SiAlON ceramic comprising, in weight percent, 2 to 20% aluminum, 1 to 12% oxygen, 2 to 12% total of one or more rare earth elements, a balance of silicon and nitrogen, and having up to 50% alpha phase.

50. The method of claim 45, wherein the end mill is constructed from a SiAlON ceramic comprising, in weight percent, 3 to 7% aluminum, 1 to 4% oxygen, 3 to 8% ytterbium, up to 1% lanthanum, and a balance of silicon and nitrogen, and having 20 to 45% alpha phase.

51. The method of claim 45, wherein the cutting speed is less than 600 meters per minute, and the end mill is constructed of a SiAlON ceramic comprising, in weight percent, no more than 5% aluminum, no more than 2% oxygen, no more than 5% ytterbium, more than 0.3% lanthanum, and a balance of silicon and nitrogen, and have 20 to 45% alpha phase.

52. The method of claim 45, wherein the cutting speed is 600 meters per minute or greater, and the end mill is constructed of a SiAlON ceramic comprising, in weight percent, at least 5% aluminum, at least 2% oxygen, at least 5% ytterbium, at least 0.8% lanthanum, and a balance of silicon and nitrogen, and has 25 to 45% alpha phase.

53. The method of claim 45, wherein the number of flutes is in the range of between 3 and 8.

54. The method of claim 45, wherein the number of cutting portions is two.

55. The method of claim 45, wherein the axial length of cut is in the range of from about one to about two times the cutting diameter.

56. The method of claim 45, wherein the cutting diameter is in the range of from about 2 to about 20 mm.

* * * * *